(12) United States Patent
Fujita et al.

(10) Patent No.: US 9,523,426 B2
(45) Date of Patent: Dec. 20, 2016

(54) GEAR CHANGE CONTROL DEVICE

(71) Applicant: HONDA MOTOR CO., LTD., Minato-Ku, Tokyo (JP)

(72) Inventors: Takahito Fujita, Wako (JP); Hideo Koyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/769,162

(22) PCT Filed: Dec. 16, 2013

(86) PCT No.: PCT/JP2013/083612
§ 371 (c)(1),
(2) Date: Aug. 20, 2015

(87) PCT Pub. No.: WO2014/129060
PCT Pub. Date: Aug. 28, 2014

(65) Prior Publication Data
US 2015/0377348 A1    Dec. 31, 2015

(30) Foreign Application Priority Data

Feb. 21, 2013   (JP) .................................. 2013-031662

(51) Int. Cl.
*F16H 61/02*   (2006.01)
*F16H 61/04*   (2006.01)
(Continued)

(52) U.S. Cl.
CPC .............. *F16H 61/04* (2013.01); *F16H 61/02* (2013.01); *F16H 61/664* (2013.01);
(Continued)

(58) Field of Classification Search
None
See application file for complete search history.

(56) References Cited

U.S. PATENT DOCUMENTS 5,175,685 A    12/1992   Hibi
5,178,043 A    1/1993    Nakano
(Continued)

FOREIGN PATENT DOCUMENTS

CN    1072890 A    6/1993
CN    1392356 A    1/2003
(Continued)

OTHER PUBLICATIONS

Official Communication corresponding to Japanese Application No. 2015-501287 dated Dec. 2, 2015.
(Continued)

*Primary Examiner* — Edwin A Young
(74) *Attorney, Agent, or Firm* — Carrier Blackman & Associates, P.C.; William D. Blackman; Jingli Wang

(57) ABSTRACT

A gear change control device is provided in which a feedback control level for making an actual gear ratio between input rotational speed and output rotational speed of a transmission coincide with a target gear ratio is calculated. A control level calculation device calculates the feedback control level based on a deviation of acceleration of change in the actual gear ratio with respect to acceleration of change in the target gear ratio thereby making it possible to enhance the control responsiveness compared with a case in which the feedback control level is calculated based on the deviation of the actual gear ratio with respect to the target gear ratio, and also to detect the occurrence of a deviation of the actual value from the target value at early stage and carry out feedback, thus enabling gear change control to be carried out more linearly than in a conventional manner.

3 Claims, 6 Drawing Sheets

(51) Int. Cl.
*F16H 61/664* (2006.01)
*F16H 61/00* (2006.01)

(52) U.S. Cl.
CPC ..... *F16H 61/6648* (2013.01); *F16H 61/6649* (2013.01); *F16H 2061/0078* (2013.01)

(56) References Cited

U.S. PATENT DOCUMENTS

| | | | |
|---|---|---|---|
| 5,293,316 A | | 3/1994 | Slicker |
| 5,609,549 A | * | 3/1997 | Usuki ............... F16H 61/12 477/125 |
| 6,010,428 A | * | 1/2000 | Hoshiya ............... F16H 61/061 477/148 |
| 6,604,039 B2 | | 8/2003 | Joe et al. |
| 6,796,924 B2 | | 9/2004 | Shimizu et al. |
| 6,859,709 B2 | | 2/2005 | Joe et al. |
| 7,037,236 B2 | | 5/2006 | Ishibashi et al. |
| 2002/0025881 A1 | * | 2/2002 | Miyazaki .......... F16H 61/66272 477/44 |
| 2003/0149520 A1 | * | 8/2003 | Taniguchi ......... F16H 61/66259 701/59 |
| 2009/0082172 A1 | | 3/2009 | Mori et al. |

FOREIGN PATENT DOCUMENTS

| | | |
|---|---|---|
| CN | 1407223 A | 4/2003 |
| CN | 1620568 A | 5/2005 |
| CN | 1784562 A | 6/2006 |
| EP | 1156238 A1 | 11/2001 |
| EP | 2042778 A2 | 4/2009 |
| JP | H0361754 A | 3/1991 |
| JP | H0478366 A | 3/1992 |
| JP | 2001099296 A | 4/2001 |
| JP | 2003042278 A | 2/2003 |
| JP | 2003120802 A | 4/2003 |
| JP | 2003172445 A | 6/2003 |
| JP | 2003-254423 A | 9/2003 |
| JP | 2008261501 A | 10/2008 |
| JP | 2009-074668 A | 4/2009 |
| JP | 2009-299814 A | 12/2009 |
| JP | 2011-185386 A | 9/2011 |
| JP | 4923999 B2 | 4/2012 |

OTHER PUBLICATIONS

Official Communications dated Aug. 26, 2016 corresponding to Chinese Patent Application No. 201380072443.5.

* cited by examiner

GEAR CHANGE CONTROL DEVICE

TECHNICAL FIELD

The present invention relates to a gear change control device that includes control level calculation means that calculates a feedback control level for making an actual gear ratio between input rotational speed and output rotational speed of a transmission coincide with a target gear ratio.

BACKGROUND ART

A toroidal type continuously variable transmission that continuously changes the gear ratio by tilting a power roller held between an input disk and an output disk, in which when controlling the gear ratio, a first feedback control that reduces the deviation between a target gear ratio and the actual gear ratio and a second feedback control that reduces the deviation between a target gear change speed and the actual gear change speed are used selectively, is known from Patent Document 1 below.

RELATED ART DOCUMENTS

Patent Documents

Patent Document 1: Japanese Patent No. 4923999

SUMMARY OF THE INVENTION

Problems to be Solved by the Invention

As described in Patent Document 1 above, the control responsiveness of gear ratio control can be enhanced by carrying out the second feedback control for reducing the deviation between a target gear change speed and the actual gear change speed compared with a case in which the first feedback control for reducing the deviation between a target gear ratio and the actual gear ratio is carried out. However, even when the second feedback control is carried out, there is a possibility that, since the deviation between the target gear change speed and the actual gear change speed only increases gradually when starting gear ratio control, the control level also only increases gradually, and the operation of a gear change actuator when starting gear ratio control is delayed, thus inhibiting linear gear change control. Moreover, since the profile (direction and size) of the thrust generated by the gear change actuator and the profile (direction and size) of the control level are not analogous, there is a possibility that the gear change control will become discontinuous and unstable.

The present invention has been accomplished in light of the above circumstances, and it is an object thereof to enable linear gear change control by detecting at an early stage the occurrence of a deviation between a target value and an actual value when carrying out feedback control of the gear ratio of a transmission.

Means for Solving the Problems

In order to attain the above object, according to a first aspect of the present invention, there is provided a gear change control device comprising control level calculation means that calculates a feedback control level for making an actual gear ratio between input rotational speed and output rotational speed of a transmission coincide with a target gear ratio, wherein the control level calculation means calculates the feedback control level based on a deviation of acceleration of change in the actual gear ratio with respect to acceleration of change in the target gear ratio.

Further, according to a second aspect of the present invention, in addition to the first aspect, the transmission is a toroidal type continuously variable transmission that comprises an input disk, an output disk, a pair of power rollers held between the input disk and the output disk, a pair of trunnions supporting the pair of power rollers, and a pair of hydraulic actuators connected to the pair of trunnions, and that changes gear ratio by driving the pair of trunnions by means of the pair of hydraulic actuators in directions opposite to each other and swinging the pair of power rollers around a trunnion axis so as to change the positions of points of contact with the input disk and the output disk.

Furthermore, according to a third aspect of the present invention, in addition to the second aspect, the control level calculation means calculates the friction of the pair of trunnions, calculates a feedforward control level that compensates for part of the friction, carries out addition of the feedforward control level and the feedback control level, and provides an output.

Moreover, according to a fourth aspect of the present invention, in addition to the third aspect, the control level calculation means calculates the friction based on at least one of the pressing force with which the input disk and the output disk hold the pair of power rollers therebetween, the coefficient of friction of a sliding part of the pair of trunnions, and the gear ratio of the transmission.

A toroidal type continuously variable transmission T of an embodiment corresponds to the transmission of the present invention, and an electronic control unit U of the embodiment corresponds to the control level calculation means of the present invention.

Effects of the Invention

In accordance with the first aspect of the present invention, since the control level calculation means, which calculates a feedback control level for making an actual gear ratio between input rotational speed and output rotational speed of a transmission coincide with a target gear ratio, calculates the feedback control level based on a deviation of acceleration of change in the actual gear ratio with respect to acceleration of change in the target gear ratio, not only is it possible to enhance the control responsiveness compared with a case in which the feedback control level is calculated based on the deviation of the actual gear ratio with respect to the target gear ratio or a case in which the feedback control level is calculated based on the deviation of the speed of change in the actual gear ratio with respect to the speed of change in the target gear ratio, but it is also possible to detect the occurrence of a deviation of the actual value from the target value at early stage and carry out feedback, thus enabling gear change control to be carried out more linearly than in a conventional manner.

Furthermore, in accordance with the second aspect of the present invention, the toroidal type continuously variable transmission, which changes gear ratio by driving the pair of trunnions by means of the pair of hydraulic actuators in directions opposite to each other and by swinging the pair of power rollers around the trunnion axis so as to change the positions of points of contact with the input disk and the output disk, drives the trunnion from the neutral position in one direction when the gear ratio is changed, and when the change of the gear ratio is ended drives the trunnion from the neutral position toward the other direction. Since the profile (direction or size) of the thrust outputted by the hydraulic actuator in order to drive the trunnion is similar to the profile (direction or size) of the deviation of the acceleration of change in the actual gear ratio with respect to the acceleration of change in the target gear ratio, applying the present control to the toroidal type continuously variable transmission enables the gear change control thereof to be further stabilized.

Moreover, in accordance with the third aspect of the present invention, since the control level calculation means calculates the friction of the pair of trunnions, calculates a feedforward control level that compensates for part of the friction, carries out addition of the feedforward control level and the feedback control level, and provides an output, it is possible, while enhancing the control responsiveness by compensating for the friction of the trunnion by means of the feedforward control level, to avoid a situation in which the feedforward control level becomes excessive and control is carried out to give an unintended gear ratio.

Furthermore, in accordance with the fourth aspect of the present invention, since the control level calculation means calculates the friction based on at least one of the pressing force with which the input disk and the output disk hold the pair of power rollers therebetween, the coefficient of friction of a sliding part of the pair of trunnions, and the gear ratio of the transmission, it is possible to calculate the friction with good precision.

EXPLANATION OF REFERENCE NUMERALS AND SYMBOLS

15 Input disk
16 Output disk
18 Trunnion axis
19 Power roller
21 Trunnion
27 Hydraulic actuator
T Toroidal type continuously variable transmission (transmission)
U Electronic control unit (control level calculation means)

MODE FOR CARRYING OUT THE INVENTION

An embodiment of the present invention is explained below by reference to FIG. 1 to FIG. 6.

First Embodiment

Figure 1:
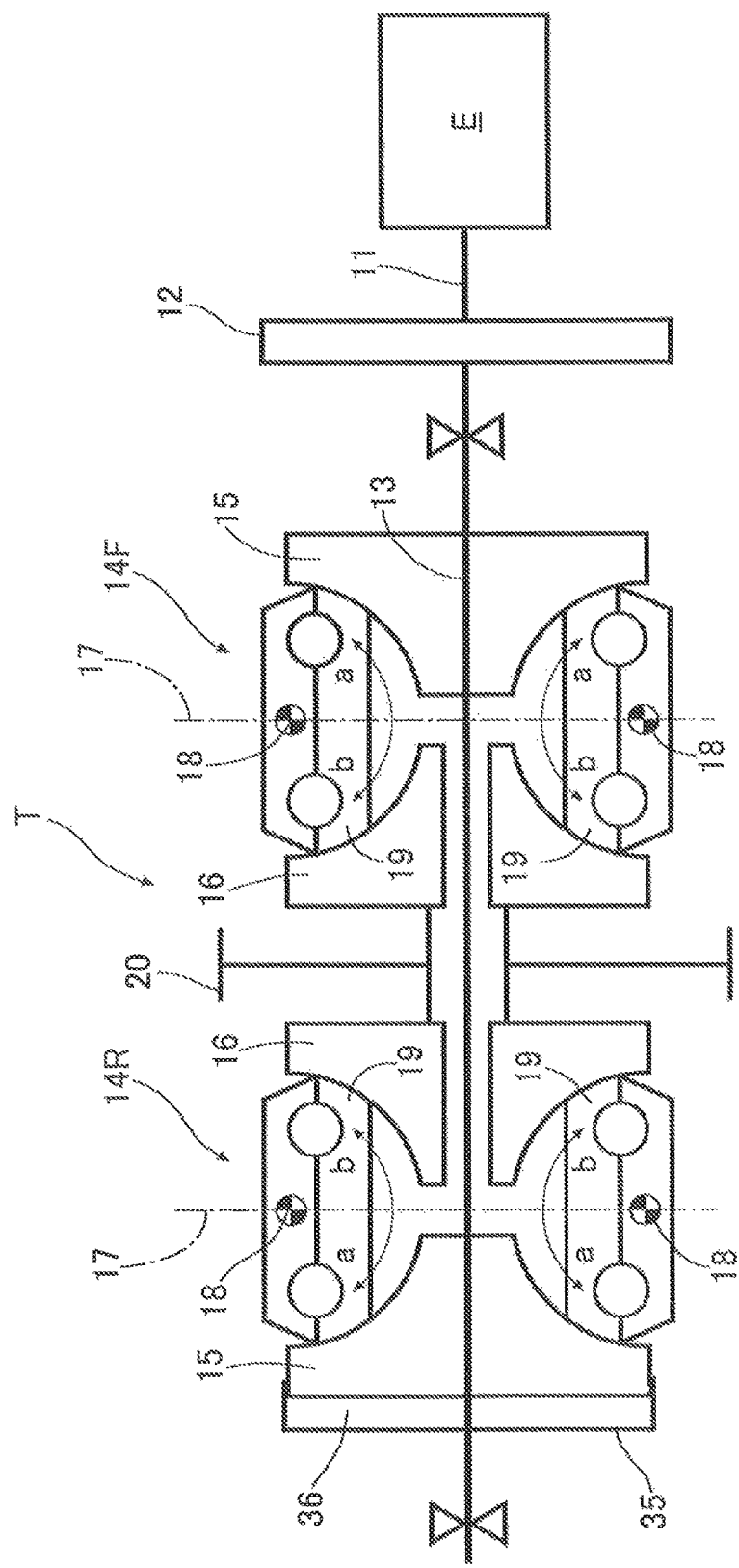
FIG. 1 is a skeleton diagram of a toroidal type continuously variable transmission. (first embodiment)

As shown in FIG. 1, a toroidal type continuously variable transmission T for an automobile includes an input shaft 13 connected to a crankshaft 11 of an engine E via a damper 12, and a first continuously variable transmission mechanism 14F and a second continuously variable transmission mechanism 14R, which have substantially the same structure, are supported on the input shaft 13. The first continuously variable transmission mechanism 14F includes a substantially cone-shaped input disk 15 fixed to the input shaft 13, a roughly cone-shaped output disk 16 relatively rotatably and axially slidably supported on the input shaft 13, and a pair of power rollers 19 and 19 that are capable of abutting against the input disk 15 and the output disk 16 while being rotatably supported around a roller axis 17 and tiltably supported around trunnion axes 18 and 18. Opposing faces of the input disk 15 and the output disk 16 are formed into toroidal curves, and when the power rollers 19 and 19 tilt around the trunnion axes 18 and 18, the points of contact of the power rollers 19 and 19 against the input disk 15 and the output disk 16 change.

The second continuously variable transmission mechanism 14R is disposed in a substantially plane-symmetrical manner with respect to the first continuously variable transmission mechanism 14F with a drive gear 20 sandwiched therebetween, the drive gear 20 and the output disks 16 and 16 of the first and second continuously variable transmission mechanisms 14F and 14R being formed as a unit. Whereas the input disk 15 of the first continuously variable transmission mechanism 14F is fixed to the input shaft 13, the input disk 15 of the second continuously variable transmission mechanism 14R is relatively non-rotatably and axially movably spline-bonded to the input shaft 13 and slidably fitted into a cylinder 35 formed at the left end of the input shaft 13. Therefore, if hydraulic pressure is supplied to an oil chamber 36 in the interior of the cylinder 35 the input disk 15 of the second continuously variable transmission mechanism 14R and the output disks 16 and 16 of the first and second continuously variable transmission mechanisms 14F and 14R are pushed toward the input disk 15 of the first continuously variable transmission mechanism 14F, thus generating a load that suppresses slip between the input disks 15 and 15 and output disks 16 and 16 and the power rollers 19.

Figure 2:
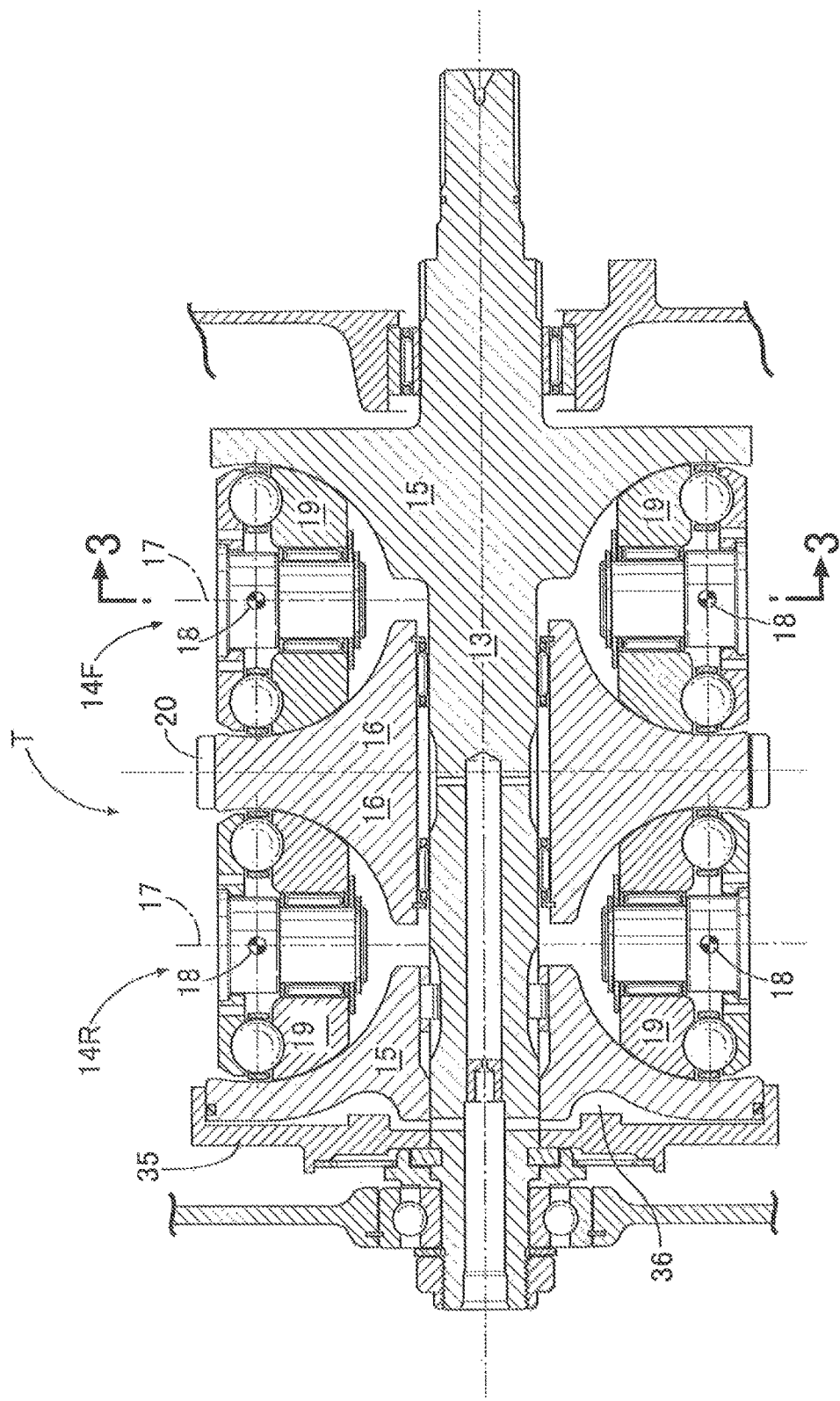
FIG. 2 is an enlarged view of an essential part of FIG. 1. (first embodiment)
Figure 3:
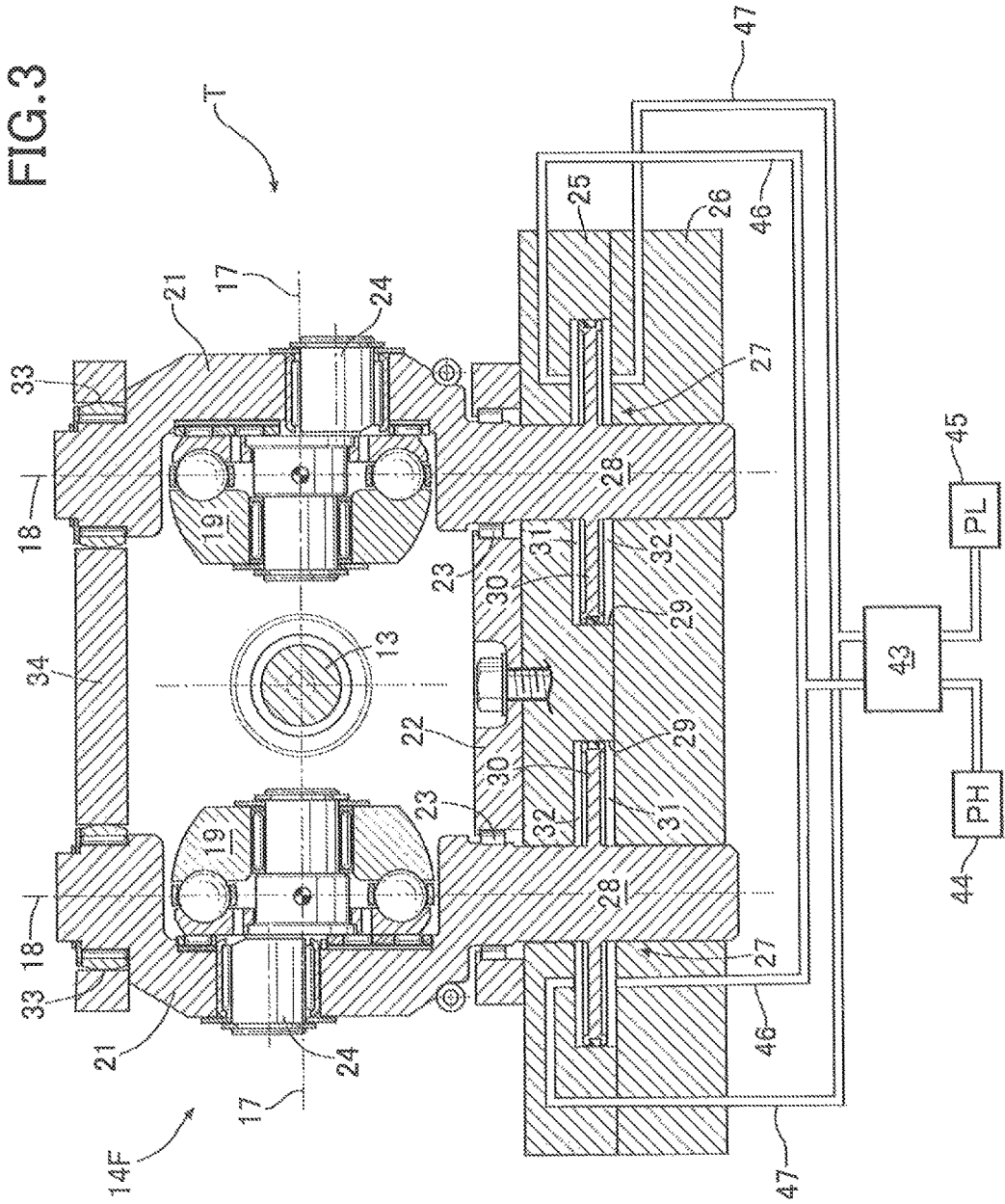
FIG. 3 is a sectional view along line 3-3 in FIG. 2. (first embodiment)

As is clear from FIG. 2 and FIG. 3, the first continuously variable transmission mechanism 14F (or the second continuously variable transmission mechanism 14R) includes a pair of left and right trunnions 21 and 21 disposed so as to sandwich the input shaft 13, a lower part of each trunnion 21 being vertically slidably and, via a roller bearing 23, rotatably supported on a lower support plate 22. Each trunnion 21 has one end of a pivot shaft 24 that is bent into a crank shape rotatably supported thereon, and the power roller 19 is rotatably supported on the other end of the pivot shaft 24.

Piston rods 28 and 28 of a pair of hydraulic actuators 27 and 27 provided on hydraulic control blocks 25 and 26 are formed integrally with the lower ends of the trunnions 21 and 21 respectively. Each hydraulic actuator 27 is formed from a cylinder 29 formed in the hydraulic control block 25, a piston 30 formed integrally with the piston rod 28 and slidably fitted into the cylinder 29, a speed increasing oil chamber 31 defined beneath the piston 30, and a speed decreasing oil chamber 32 defined above the piston 30.

The upper ends of a total of four of the trunnions 21 are each pivotably supported on four corners of an upper support plate 34 via spherical surface couplings 33, and their movements are synchronized when two of the trunnions 21 and 21 move upward and the other two trunnions 21 and 21 move downward.

Connected to a gear change control valve 43 are a PH hydraulic pressure source 44 that outputs a high pressure PH pressure and a PL hydraulic pressure source 45 that outputs a low pressure PL pressure. Also connected to the gear change control valve 43 via an oil passage 46 are two of the speed increasing oil chambers 31 and 31 and, via an oil passage 47, two of the speed decreasing oil chambers 32 and 32.

Therefore, when the high pressure PH pressure is supplied to the speed increasing oil chamber 31 and the low pressure PL pressure is supplied to the speed decreasing oil chamber 32, the piston 30 and the piston rod 28 ascend, whereas when the high pressure PH pressure is supplied to the speed decreasing oil chamber 32 and the low pressure PL pressure is supplied to the speed increasing oil chamber 31, the piston 30 and the piston rod 28 descend. In this way the pair of trunnions 21 and 21 of each of the first and second continuously variable transmission mechanisms 14F and 14R are driven in opposite directions to each other.

The operation of the first continuously variable transmission mechanism 14F is now explained.

When, by means of the gear change control valve 43, the PH hydraulic pressure source 44 is connected to the speed increasing oil chambers 31 and 31 and the PL hydraulic pressure source 45 is connected to the speed decreasing oil chambers 32 and 32, the hydraulic actuators 27 and 27 operate and one of the pair of trunnions 21 and 21 ascends from the neutral position and the other descends from the neutral position. As a result, the power rollers 19 and 19 tilt in the direction of arrow a in FIG. 1, the point of contact with the input disk 15 moves radially outwardly with respect to the input shaft 13, the point of contact with the output disk 16 moves radially inwardly with respect to the input shaft 13, and rotation of the input disk 15 is increased in speed and transmitted to the output disk 16, thus continuously decreasing the gear ratio of the toroidal type continuously variable transmission T.

On the other hand, when, by means of the gear change control valve 43, the PH hydraulic pressure source 44 is connected to the speed decreasing oil chambers 32 and 32 and the PL hydraulic pressure source 45 is connected to the speed increasing oil chambers 31 and 31, the hydraulic actuators 27 and 27 operate, and one of the pair of trunnions 21 and 21 descends from the neutral position and the other ascends from the neutral position. As a result, the power rollers 19 and 19 tilt in the direction of arrow b in FIG. 1, the point of contact with the input disk 15 moves radially inwardly with respect to the input shaft 13, the point of contact with the output disk 16 moves radially outwardly with respect to the input shaft 13, and rotation of the input disk 15 is reduced in speed and transmitted to the output disk 16, thus continuously increasing the gear ratio of the toroidal type continuously variable transmission T.

As hereinbefore described, by moving the pair of trunnions 21 and 21 from the neutral position in opposite directions to each other by means of the hydraulic actuators 27 and 27 the gear ratio is changed toward a target gear ratio. When the gear ratio attains the target gear ratio, the pair of trunnions 21 and 21 are made to return to the neutral position by means of the hydraulic actuators 27 and 27, and the thrust of the hydraulic actuators 27 and 27 is made to balance with a reaction force that the power rollers 19 and 19 receive from the input disk 15 and the output disk 16, thus maintaining the target gear ratio.

The operation of the second continuously variable transmission mechanism 14R is the same as the operation of the first continuously variable transmission mechanism 14F described above, and the first and second continuously variable transmission mechanisms 14F and 14R carry out a gear change operation in synchronism. Therefore, the driving force inputted from the crankshaft 11 of the engine E into the input shaft 13 is continuously changed in speed at any gear ratio within the gear ratio range of the toroidal type continuously variable transmission T, and outputted from the drive gear 20.

Figure 4:
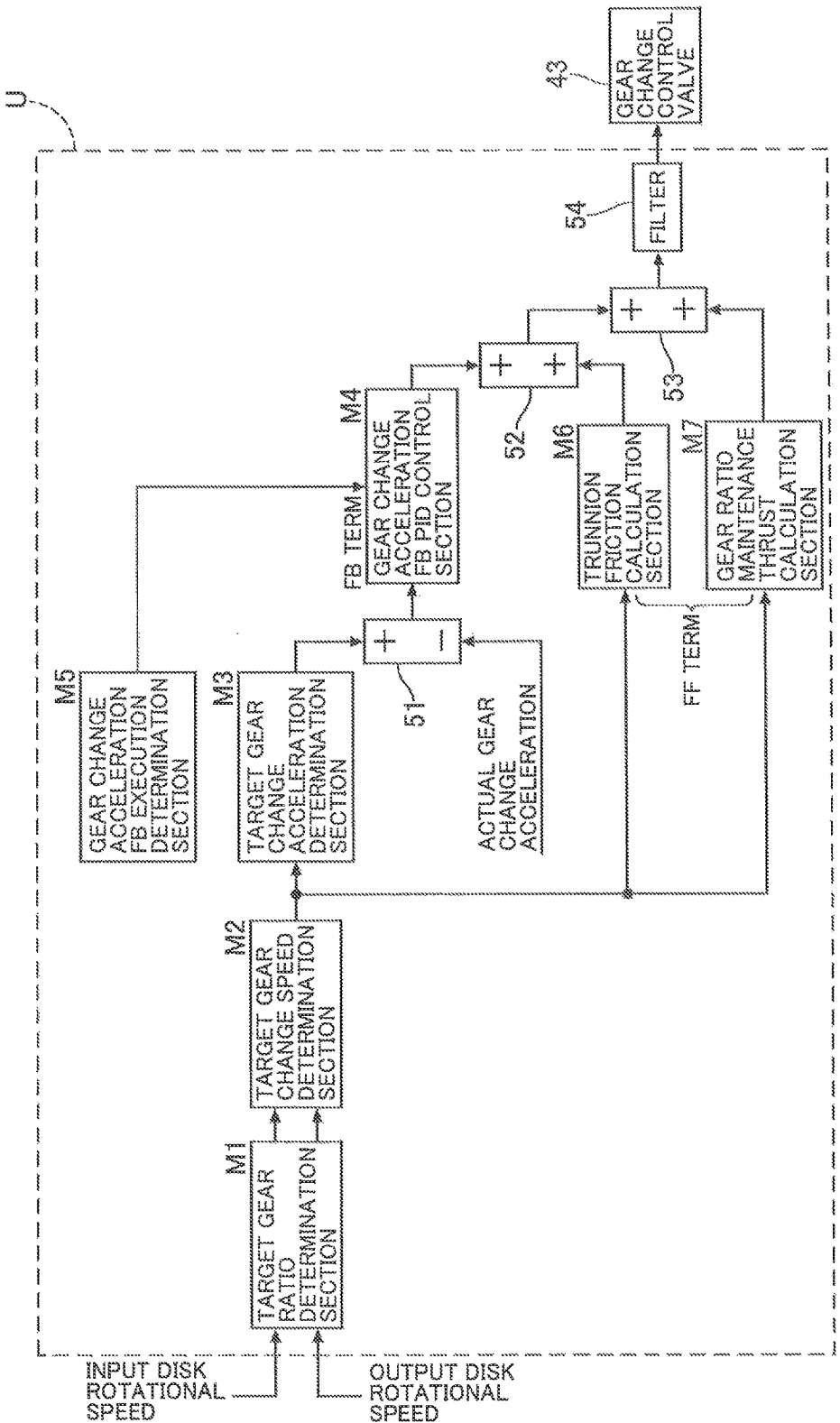
FIG. 4 is a block diagram of a gear ratio control system. (first embodiment)

The control system of the toroidal type continuously variable transmission T is now explained by reference to FIG. 4.

An electronic control unit U for controlling the gear ratio of the toroidal type continuously variable transmission T includes a target gear ratio determination section M1, a target gear change speed determination section M2, a target gear change acceleration determination section M3, a gear change acceleration feedback PID control section M4, a gear change acceleration feedback execution determination section M5, a trunnion friction calculation section M6, and a gear ratio maintenance thrust calculation section M7.

The target gear ratio determination section M1 calculates a target gear ratio of the toroidal type continuously variable transmission T based on the rotational speed of the input disk 15, the rotational speed of the output disk 16, the vehicle speed, accelerator pedal position, etc. The target gear change speed determination section M2 calculates a target gear change speed that is the percentage change over time of the target gear ratio calculated in the target gear ratio determination section M1. The target gear change acceleration determination section M3 calculates a target gear change acceleration that is the percentage change over time of the target gear change speed calculated in the target gear change speed determination section M2.

A subtractor 51 calculates a deviation of the gear change acceleration by subtracting an actual gear change acceleration calculated based on the rotational speed of the input disk 15 and the rotational speed of the output disk 16 from the target gear change acceleration calculated in the target gear change acceleration determination section M3. The gear change acceleration feedback PID control section M4 carries out PID processing of the deviation of the gear change acceleration inputted from the subtractor 51 and calculates a PID feedback control level in order to make the deviation converge to zero. In this process, the PID gain can be switched based on the friction of the trunnions 21 and 21, which is described later, the oil temperature of the toroidal type continuously variable transmission T, the gear ratio of the toroidal type continuously variable transmission T, etc.

Furthermore, the gear change acceleration feedback execution determination section M5 determines whether or not it is possible to execute feedback control by means of gear change acceleration, and only when it is possible is execution of gear change control by means of the gear change acceleration feedback PID control section M4 permitted. For example, if the engine rotational speed is no greater than the idle rotational speed, since the line pressure generated by an oil pump is insufficient, it becomes difficult for the actual gear ratio to follow the target gear ratio, the feedback control level increases, because of this the line pressure becomes further insufficient, and the control becomes unstable. In such a case, since feedback control by means of gear change acceleration cannot be executed appropriately, the execution thereof is prohibited.

The trunnion friction calculation section M6 calculates a control level corresponding to the friction when the trunnions 21 and 21 move, based on the load with which the input disk 15 and the output disk 16 hold the power rollers 19 and 19 therebetween, the coefficient of friction of the sliding part of the trunnions 21 and 21, the gear ratio of the toroidal type continuously variable transmission T, etc. The control level, corresponding to the friction, calculated by the trunnion friction calculation section M6 is added to the PID feedback control level outputted by the gear change acceleration feedback PID control section M4 in an adder 52.

The gear ratio maintenance thrust calculation section M7 calculates a control level corresponding to the thrust that is to be generated by the hydraulic actuators 27 and 27 in order to maintain a constant gear ratio. This control level is calculated based on the torque inputted from the engine E into the toroidal type continuously variable transmission T, the angle of tilting of the power rollers 19 and 19, the specifications of the toroidal type continuously variable transmission T, etc. The control level, corresponding to the thrust of the hydraulic actuators 27 and 27, calculated by the gear ratio maintenance thrust calculation section M7 is added to the control level outputted by the adder 52 in an adder 53, then subjected to elimination of a noise component by means of a filter 54, and used for controlling the degree of opening of a flow rate control valve that supplies hydraulic pressure to the hydraulic actuators 27 and 27.

The function of the control system of the toroidal type continuously variable transmission T is now further explained by reference to FIG. 5.

Figure 5:
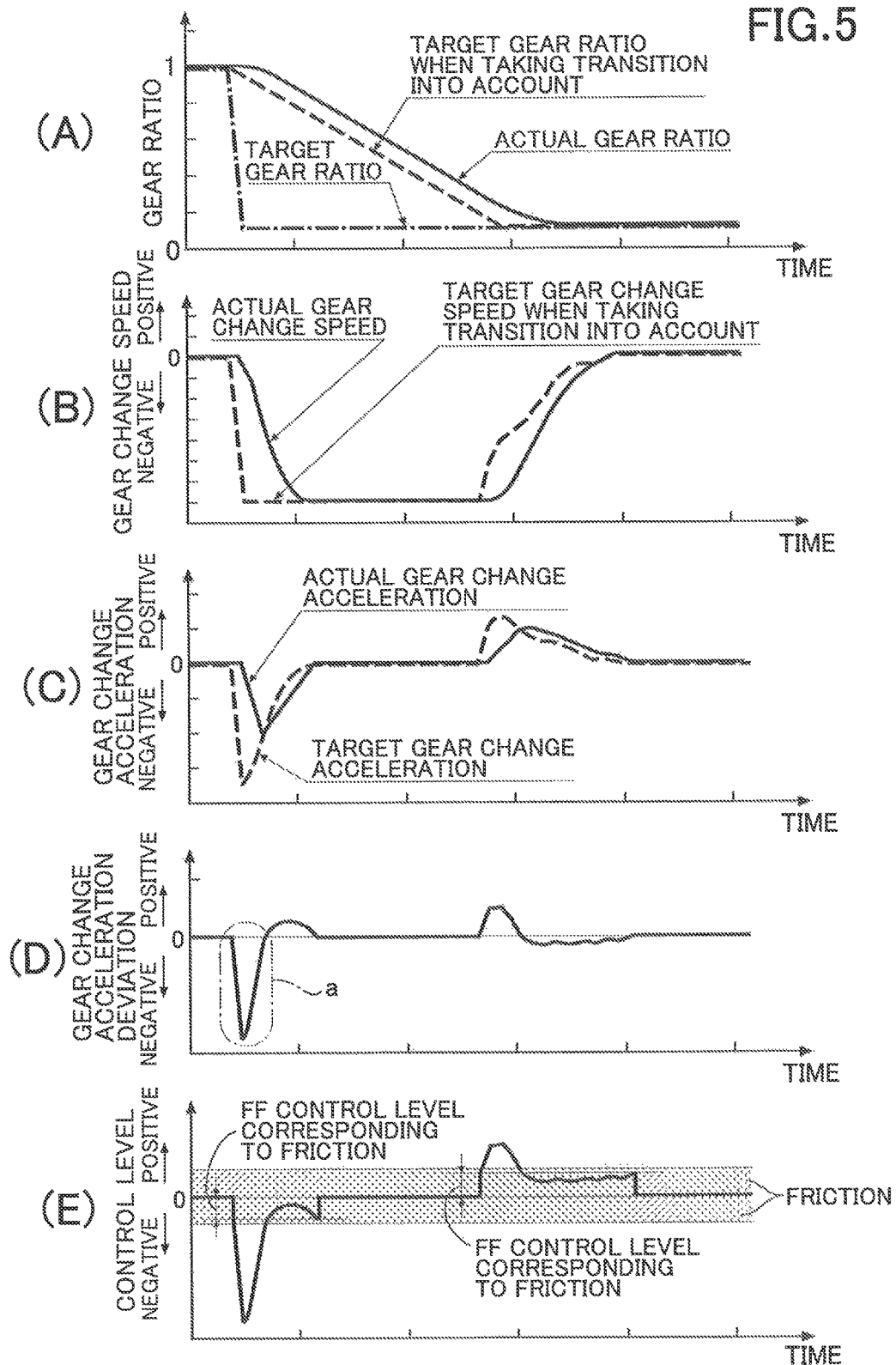
FIG. 5 is a time chart showing the change characteristics of gear ratio, gear change speed, gear change acceleration, deviation of gear change acceleration, and control level. (first embodiment)

The chain line of FIG. 5 (A) is one example of a target gear ratio obtained from a map, etc. The target gear ratio obtained from a map, etc. rapidly changes at the same time as starting control, but as shown in FIG. 5 (A) by the broken line one obtained by smoothing the target gear ratio (see the chain line) while taking into consideration transition characteristics is used as an actual target gear ratio. The solid line of FIG. 5 (A) denotes the characteristics of change in the actual gear ratio finally obtained by the present control.

The target gear change speed determination section M2 calculates a target gear change speed corresponding to the target gear ratio (see the broken line in FIG. 5 (A)) calculated in the target gear ratio determination section M1. As shown in FIG. 5 (B) by the broken line, the target gear change speed falls rapidly when starting control, and this enables the gear change actuators 27 and 27 to be operated quickly, thus enhancing the control responsiveness. The target gear change speed recovers gradually when control is ended compared with when starting control, and this can prevent the actual gear ratio from overshooting the target gear ratio. The actual gear change speed shown by the solid line follows the target gear change speed shown by the broken line with a slight delay.

The target gear change acceleration determination section M3 calculates a target gear change acceleration (see the broken line of FIG. 5 (C)), which is the percentage change over time of the target gear change speed calculated in the target gear change speed determination section M2, and an actual gear change acceleration (see the solid line of FIG. 5 (C)), which is the percentage change over time of the actual gear change speed. The actual gear change acceleration shown by the solid line follows the target gear change acceleration shown by the broken line with a slight delay.

FIG. 5 (D) shows the deviation of the target gear change acceleration with respect to the actual gear change acceleration that is to be calculated in the gear change acceleration feedback PID control section M4; when starting control a large negative deviation occurs and then a small positive deviation occurs, and when control is ended a somewhat large positive deviation occurs and then a slight negative deviation occurs.

FIG. 5 (E) shows the control level obtained by adding the PID feedback control level calculated by the gear change acceleration feedback PID control section M4 from the deviation shown in FIG. 5 (D) and the feedforward control level, corresponding to the friction of the trunnions 21 and 21, calculated by the trunnion friction calculation section M6. Here, addition of the feedforward control level, corresponding to the thrust that is to be generated by the hydraulic actuators 27 and 27, calculated by the gear ratio maintenance thrust calculation section M7 is omitted. The hatched area denotes the net control level corresponding to the friction, and the control level that is actually added is set slightly smaller than the net control level corresponding to the friction.

As hereinbefore described, since the control level by which the electronic control unit U controls the degree of opening of the gear change control valve 43 is the value obtained by addition of the PID feedback control level calculated by PID processing of the deviation of gear change acceleration, the feedforward control level corresponding to the friction of the trunnions 21 and 21, and the control level corresponding to the thrust that is to be generated by the hydraulic actuators 27 and 27 in order to maintain a constant gear ratio, due to the PID feedback control level the trunnions 21 and 21 move by overcoming the friction and the reaction force of the power rollers 19 and 19, thus changing the gear ratio of the toroidal type continuously variable transmission T.

In this process, since the PID feedback control level is calculated based on the deviation of the gear change acceleration, a large deviation when starting control (see part a of FIG. 5 (D)) can occur; not only does this enable the control responsiveness to be enhanced compared with a case in which the PID feedback control level is calculated based on a deviation of the gear ratio or a deviation of the gear change speed, but it is also possible to carry out gear change control more linearly than in a conventional manner by detecting the occurrence of a deviation at an early stage and carrying out feedback.

Furthermore, since the final control level is outputted by adding, to the PID feedback control level, the feedforward control level corresponding to the friction of the trunnions 21 and 21 and the feedforward control level corresponding to the thrust that is to be generated by the hydraulic actuators 27 and 27 in order to maintain the gear ratio by counteracting the reaction force from the power rollers 19 and 19, it is possible to control the gear ratio with good precision without being affected by the friction of the trunnions 21 and 21 and the reaction force from the power rollers 19 and 19.

In this process, since the feedforward control level corresponding to the friction of the trunnions 21 and 21 is set slightly smaller than the actual value corresponding to the friction (see FIG. 5 (E)), it is possible to avoid a situation in which the feedforward control level becomes excessive and control is carried out to give an unintended gear ratio.

Figure 6:
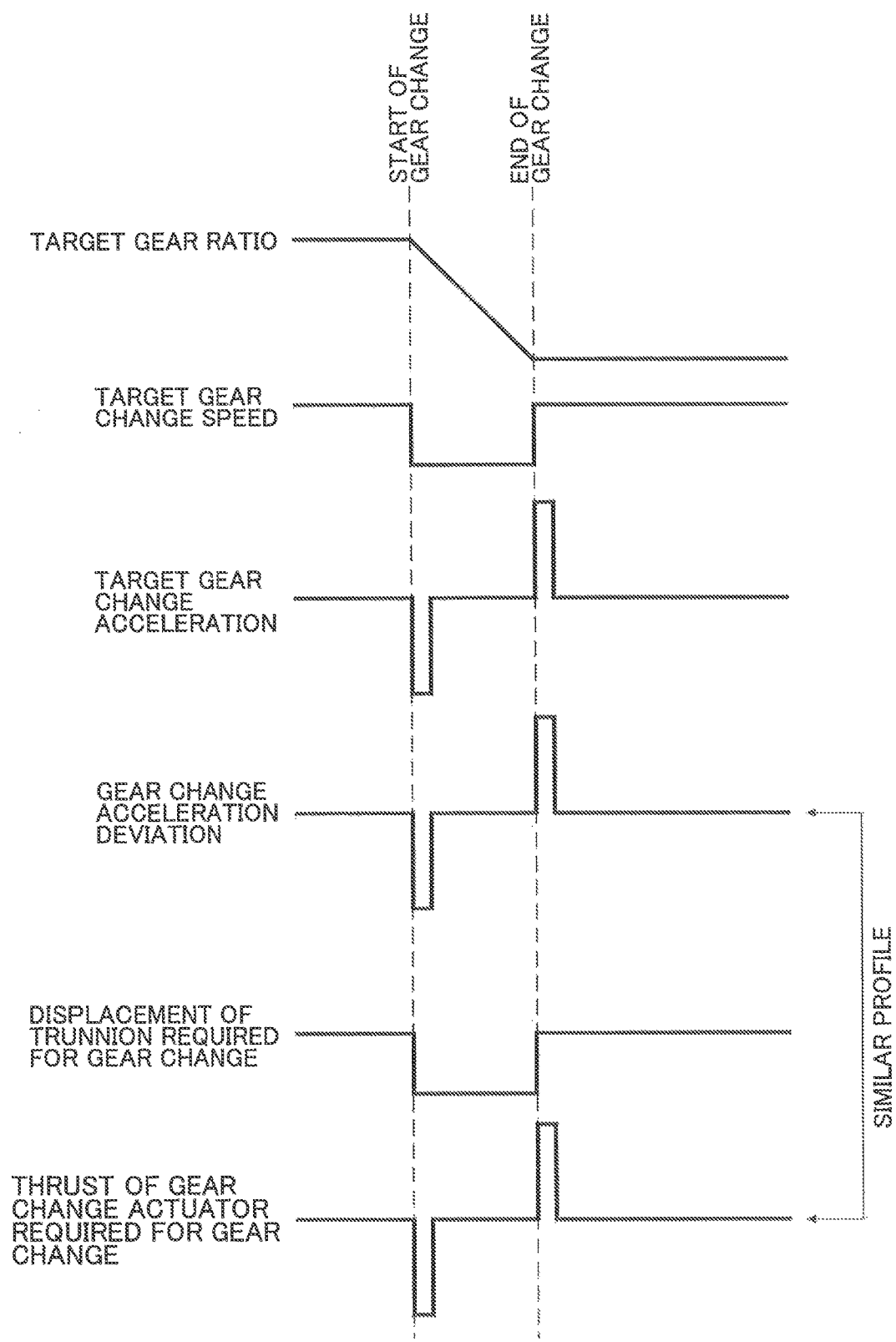
FIG. 6 is a diagram for explaining the profile of deviation of gear change acceleration and the profile of thrust required for a gear change actuator. (first embodiment)

The time chart of FIG. 6 schematically shows changes in target gear ratio, target gear change speed, target gear change acceleration, gear change acceleration deviation, stroke of the trunnions 21 and 21 necessary for gear change, and thrust of the hydraulic actuators 27 and 27 necessary for the stroke of the trunnions 21 and 21. In the toroidal type continuously variable transmission T, it is necessary to drive the hydraulic actuators 27 and 27 in one direction when starting gear change control and drive the hydraulic actuators 27 and 27 in the other direction when ending gear change control.

As is clear from the same figure, the profile of the line of the gear change acceleration deviation is similar to the profile of the line of the thrust of the hydraulic actuators 27 and 27 necessary for gear change; when starting control both the former and the latter change in one direction (downward in the figure), and when ending control both the former and the latter change in the other direction (upward in the figure). The gear change acceleration deviation is directly related to the PID feedback control level, and the PID feedback control level is directly related to the thrust of the hydraulic actuators 27 and 27. Therefore, due to the profile of the line of the gear change acceleration deviation being similar to the profile of the line of the thrust of the hydraulic actuators 27 and 27 necessary for gear change, applying the present control to the toroidal type continuously variable transmission T enables the gear change control to be further stabilized.

An embodiment of the present invention is explained above, but the present invention may be modified in a variety of ways as long as the modifications do not depart from the spirit and scope thereof.

For example, the transmission of the present invention is not limited to the toroidal type continuously variable transmission T of the embodiment and may be a transmission of another type such as a belt type continuously variable transmission.

The invention claimed is:

1. A gear change control device comprising:
 a control level calculation device that calculates a feedback control level for making an actual gear ratio between input rotational speed and output rotational speed of a transmission coincide with a target gear ratio,
 wherein the control level calculation device calculates the feedback control level for making a deviation of acceleration of change in the actual gear ratio with respect to acceleration of change in the target gear ratio converge to zero,
 wherein the transmission is a toroidal type continuously variable transmission that comprises an input disk, an output disk, a pair of power rollers held between the input disk and the output disk, a pair of trunnions supporting the pair of power rollers, and a pair of hydraulic actuators connected to the pair of trunnions, and that changes gear ratio by driving the pair of trunnions by means of the pair of hydraulic actuators in directions opposite to each other and swinging the pair of power rollers around a trunnion axis so as to change the positions of points of contact with the input disk and the output disk.

2. The gear change control device according to claim 1, wherein the control level calculation device calculates a friction of the pair of trunnions, calculates a feedforward control level that compensates for part of the friction, carries out addition of the feedforward control level and the feedback control level, and provides an output.

3. The gear change control device according to claim 2, wherein the control level calculation device calculates the friction based on at least one of a pressing force with which the input disk and the output disk hold the pair of power rollers therebetween, a coefficient of friction of a sliding part of the pair of trunnions, and the target gear ratio of the transmission.

* * * * *